United States Patent
Ohiwa et al.

(10) Patent No.: US 6,703,803 B2
(45) Date of Patent: Mar. 9, 2004

(54) FAN MOTOR DRIVING CIRCUIT (75) Inventors: Shoji Ohiwa, Saitama (JP); Motoi Otsuka, Ibaragi (JP)

(73) Assignee: Japan Servo Co. Ltd. (JP)

( * ) Notice: Subject to any disclaimer, the term of this patent is extended or adjusted under 35 U.S.C. 154(b) by 6 days.

(21) Appl. No.: 10/080,131

(22) Filed: Feb. 21, 2002

(65) Prior Publication Data

US 2003/0155886 A1 Aug. 21, 2003

(30) Foreign Application Priority Data

Feb. 22, 2001 (JP) ........................................ 2001-046433

(51) Int. Cl.$^7$ ................................................. H02P 1/00
(52) U.S. Cl. ....................... 318/138; 318/439; 318/254; 388/800; 388/806; 388/815; 388/821; 388/822; 388/915
(58) Field of Search ................................ 318/138, 254, 318/439, 599; 388/800, 806, 815, 821, 822, 915

(56) References Cited

U.S. PATENT DOCUMENTS

| 4,656,553 | A | | 4/1987 | Brown | |
|---|---|---|---|---|---|
| 5,351,336 | A | * | 9/1994 | Wilkerson | 388/811 |
| RE35,124 | E | * | 12/1995 | Erdman et al. | 318/599 |
| 5,825,972 | A | * | 10/1998 | Brown | 388/811 |
| 6,188,187 | B1 | * | 2/2001 | Harlan | 318/254 |
| 6,344,721 | B2 | * | 2/2002 | Seki et al. | 318/254 |

FOREIGN PATENT DOCUMENTS

JP          02223395          9/1990

* cited by examiner

*Primary Examiner*—Rina I. Duda
(74) *Attorney, Agent, or Firm*—Patterson, Thuente, Skaar & Christensen, P.A.

(57) ABSTRACT

A fan motor driving circuit of the present invention comprises a device for detecting a power source voltage and outputting a voltage in proportion to a difference between the power source voltage and a predetermined rated voltage when the power source voltage is greater than the rated voltage. The driving circuit also includes a device for controlling a rotary speed of a fan motor to a predetermined value by automatically varying a first signal input to a conducting current generating circuit for determining the rotary speed of the fan motor according to an output voltage of the power source voltage detecting means when the power source voltage is greater than a predetermined value.

3 Claims, 6 Drawing Sheets

PRIOR ART

FAN MOTOR DRIVING CIRCUIT

BACKGROUND OF THE INVENTION

1. Field of the Invention

This invention relates to a fan motor driving circuit and more particularly to a driving circuit for a brushless fan motor.

2. Description of the Prior Art

Figure 6:
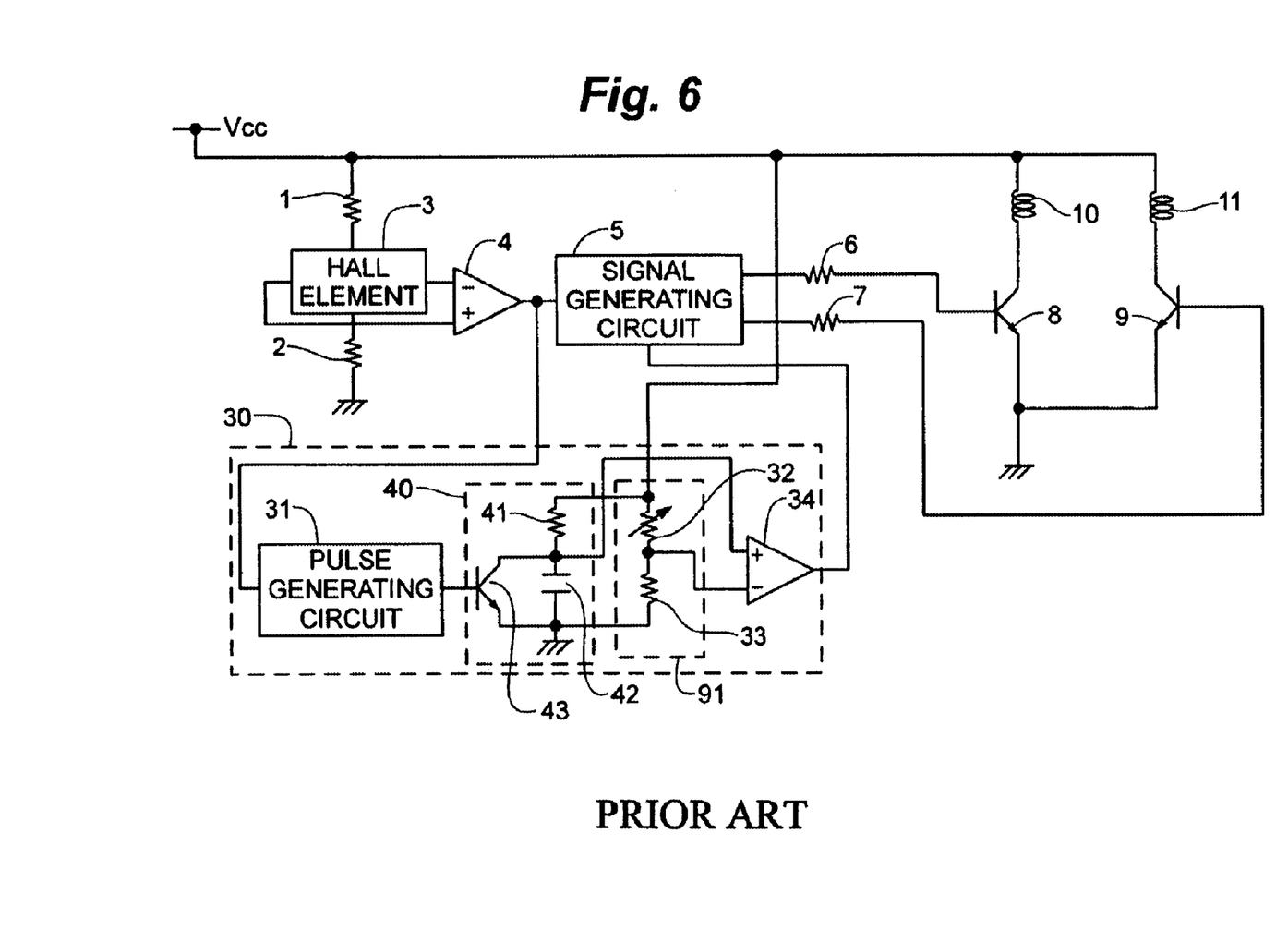
FIG. 6 is a circuit diagram of a conventional fan motor driving circuit.

FIG. 6 shows a conventional driving circuit for a DC brushless fan motor having coils separated by 180 degrees from each other to form a two-phase winding. Reference numerals 1 and 2 denote bias resistors for a hall element 3 for detecting a magnetic pole position of a rotor magnet, 4 denotes a differential amplifier for amplifying an output of the hall element 3, 5 denotes a conducting current signal generating circuit for receiving an output of the differential amplifier 4 and a signal from a rotary speed varying means 30, and generating a conducting current signal other than conducting current signals of two phases separated by 180° from each other, 6 and 7 denote buffer resistors, 8 and 9 denotes transistors which receive outputs of the conducting current signal generating circuit 5 and are conducted alternately, and 10 and 11 denote stator windings.

The rotary speed varying means 30 is composed of a rotary pulse generating circuit 31, a time constant circuit 40, a comparator 34, and a rotary speed instructing means 91 composed of a resistor 33 and a variable resistor 32.

The time constant circuit 40 is composed of a resistor 41, a capacitor 42, and a transistor 43. The rotary speed varying means 30 shapes the output of the differential amplifier 4 into a signal in a shape of rectangular wave and then generates a discharge pulse during a short period of time. The time constant circuit 40 generates a voltage of saw tooth wave form across the capacitor 42 according to a time constant determined by the resistor 41 and the capacitor 42. This voltage is divided by the resistors 32 and 33. The comparator 34 operates the conducting current signal generating circuit 5 to energize the stator windings 10 and 11, when the divided voltage reaches a reference voltage. That is, the conducting current signal generating circuit 5 interrupts the conducting current during a predetermined period of time, when an output of the hall element 3 is generated, so that an effective conducting current is reduced, and that the rotary speed of the fan motor is controlled according to the current interruption time.

In the conventional driving circuit, however, the rotary speed of the fan motor is varied according to the voltage variation of the power source, because no feedback circuit of the rotary speed of the motor is provided, though it is possible to vary the rotary speed of the motor by the variable resistor 32 of the rotary speed instructing means 91.

The power consumption is increased in proportion to the square of the rotor speed, the temperature becomes high, and the noise is increased remarkably, especially when the voltage of the power source is elevated over the rated voltage.

In order to solve the above problems, it is considered to control the variation of the rotary speed by the speed feed back, however, the circuit becomes complicated and the space and the cost for installing the electronic parts are increased.

SUMMARY OF THE INVENTION

An object of the invention is to provide a fan motor driving circuit which solves the above problems.

Another object of the present invention is to provide a fan motor driving circuit comprising means for detecting a power source voltage and outputting a voltage in proportion to a difference between the power source voltage and a predetermined rated voltage when the power source voltage is elevated over the rated voltage, and means for controlling a rotary speed of a fan motor to a predetermined value by varying an elementary signal for determining the rotary speed of the fan motor according to an output voltage of the power source voltage detecting means automatically when the power source voltage is elevated over a predetermined value.

A further object of the present invention is to provide a brushless fan motor driving circuit comprising means for detecting a position of a permanent magnet of a rotor, a conducting current signal generating circuit for generating a conducting current signal according to an output of the position detecting means, a conducting current control element for energizing stator windings of the motor according to the conducting current signal, means for varying a rotary speed of a fan motor, means for generating a rotary speed instructing voltage, means for detecting a power source voltage and outputting a voltage in proportion to a difference between the power source voltage and a rated voltage when the power source voltage is elevated over a predetermined rated voltage, and means for controlling a rotary speed of a fan motor to a predetermined value by varying the rotary speed instructing voltage by an output voltage of the power source voltage detecting means automatically when the power source voltage is elevated over the predetermined rated voltage, the rotary speed varying means comparing a saw-tooth wave signal generated in a saw-tooth wave generating circuit including a time constant circuit consisting of a resistor and a capacitor with the rotary speed instructing voltage so as to vary an energizing time of the stator windings.

Yet further object of the present invention is to provide a brushless fan motor driving circuit comprising means for detecting a position of a permanent magnet of a rotor, a conducting current signal generating circuit for generating a conducting current signal according to an output of the position detecting means, a conducting current control element for energizing stator windings of the motor according to the conducting current signal, means for varying a rotary speed of a fan motor, the rotary speed varying means comparing a saw-tooth wave signal generated in a saw-tooth wave generating circuit including a time constant circuit consisting of a resistor and a capacitor with the rotary speed varying voltage so as to vary an energizing time of the stator windings, means for generating a rotary speed instructing voltage for setting a rotary speed of a brushless fan motor to a predetermined value, means for detecting a power source voltage and outputting a voltage in proportion to a difference between the power source voltage and a rated voltage when the power source voltage is elevated over a predetermined rated voltage, and means for controlling a rotary speed of the fan motor to a predetermined value by varying an inclined angle of the saw-tooth wave of the rotary speed varying means according to an output voltage of the power source voltage detecting means automatically when the power source voltage is elevated over the predetermined rated voltage.

A still further object of the present invention is to provide a brushless fan motor driving circuit comprising means for detecting a position of a permanent magnet of a rotor, a conducting current signal generating circuit for generating a conducting current signal according to an output of the position detecting means, a conducting current control element for energizing stator windings of the motor according to the conducting current signal, means for detecting a power source voltage and outputting a voltage in proportion to a difference between the power source voltage and a rated voltage when the power source voltage is elevated over a predetermined rated voltage, means for detecting a current from the conducting current control element, a comparator for comparing an output of the conducting current detecting means with an output of the power source voltage detecting means, and means for controlling a rotary speed of a fan motor to a predetermined value by controlling the conducting current signal generating circuit automatically when the power source voltage is elevated over the predetermined rated voltage, an output of the comparator being supplied to the conducting current signal generating circuit.

A still further object of the present invention is to provide a brushless fan motor driving circuit comprising means for detecting a position of a permanent magnet of a rotor, a conducting current signal generating circuit for generating a conducting current signal according to an output of the position detecting means, a conducting current control element for energizing stator windings of the motor according to the conducting current signal, means for detecting a power source voltage and outputting a voltage in proportion to a difference between the power source voltage and a rated voltage when the power source voltage is elevated over a predetermined rated voltage, voltage control means provided between a power source and two stator windings, and means for controlling a rotary speed of a fan motor to a predetermined value by controlling the voltage control means automatically by the output of the power source voltage detecting means when the power source voltage is elevated over the predetermined rated voltage.

A still further object of the present invention is to provide a brushless fan motor driving circuit comprising means for detecting a position of a permanent magnet of a rotor, a conducting current signal generating circuit for generating a conducting current signal according to an output of the position detecting means, a conducting current control element for energizing stator windings of the motor according to the conducting current signal, means for varying a rotary speed of a fan motor, PWM rotary speed instructing means for setting a rotary speed of the fan motor, means for detecting a power source voltage and outputting a voltage in proportion to a difference between the power source voltage and a rated voltage when the power source voltage is elevated over a predetermined rated voltage, and means for controlling a rotary speed of the fan motor to a predetermined value by varying an output voltage the PWM rotary speed instructing means according to an output of the power source voltage detecting means automatically when the power source voltage is elevated over the predetermined rated voltage, the rotary speed varying means comparing a saw-tooth wave signal generated in a saw-tooth wave generating circuit including a time constant circuit consisting of a resistor and a capacitor with the output voltage of the PWM rotary speed instructing means so as to vary an energizing time of the stator windings.

Other object and advantages will become apparent from the following description of the preferred embodiments taken in conjunction with the accompanying drawings.

DESCRIPTION OF THE PREFERRED EMBODIMENTS

Figure 1:
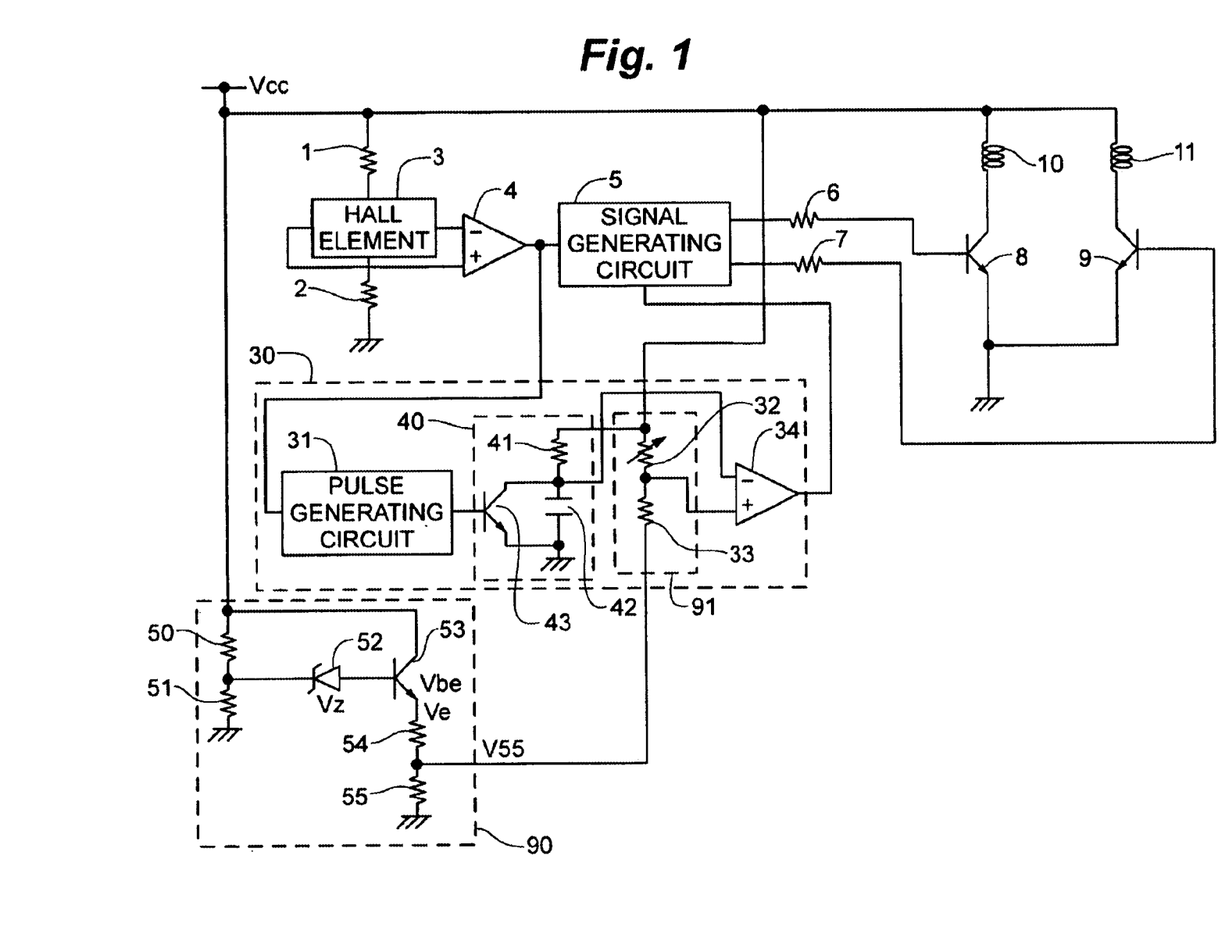
FIG. 1 is a circuit diagram of a fan motor driving circuit of an embodiment according to the present invention.

FIG. 1 shows an embodiment of a fan motor driving circuit according to the present invention.

In FIG. 1, parts of the fan motor driving circuit which are similar to corresponding parts of the fan motor driving circuit shown in FIG. 6 have been given corresponding reference numerals and need not be further redescribed.

As shown in FIG. 1, the fan motor driving circuit of the present invention has a power source voltage detecting means 90. An output voltage of a rotary speed instructing means 91 is controlled automatically by an out signal of the power source voltage detecting means 90.

In the power source voltage detecting means 90, a power source voltage Vcc is divided by resistors 50 and 51 and a divided voltage is applied to a base of a transistor 53 through a Zener diode 52 set to a rated voltage of a fan motor only when the power source voltage Vcc is increased over the rated voltage. A collector of the transistor 53 is connected to the power source, an emitter of the transistor 53 is grounded through resistors 54 and 55, and a connecting point of the resistors 54 and 55 is connected to an end of a resistor 33 of the rotary speed instructing means 91. Thus, the rotary speed of the fan motor is set to a required number by a variable resistor 32.

In the fan motor driving circuit shown in FIG. 1, a rotary speed varying means 30 controls the fan motor so as to rotate at a rotary speed set by the variable resistor 32 when the power source voltage Vcc is lower than the rated voltage, because no output is generated from the Zener diode 52, the transistor 53 is not fired, and no voltage is applied on the resistor 33.

A current flows through the transistor 53 and a voltage V55 across the resistor 55 is increased when the power source voltage Vcc is increased and the voltage divided by the resistors 50 and 51 is elevated over a Zener voltage (rated voltage of the fan motor) of the Zener diode 52. A conducting current duty of an output pulse of a comparator 34 is reduced, so that a conducting current signal generating circuit 5 serves as to reduce the rotary speed of the motor, when the elevated voltage V55 is applied to the resistor 33.

The above operation can be expressed by following equations (1) and (2).

$$Ve = \frac{R_1}{R_1 + R_2} Vcc - (Vz + Vbe) \quad (1)$$

$$V_{55} = \frac{R_{55}}{R_{54} + R_{55}} Ve \quad (2)$$

where Vcc is the power source voltage, Vz is the Zener voltage, Ve is an emitter voltage of the transistor 53, Vbe is a voltage difference between the emitter and collector of the transistor 53, R1, R2, R54 and R55 are resistances of resisters, respectively, and V55 is the voltage across the resistor 55.

As stated above, the rotary speed instructing voltage is elevated by V55, when the power source voltage Vcc is increased.

Figure 2:
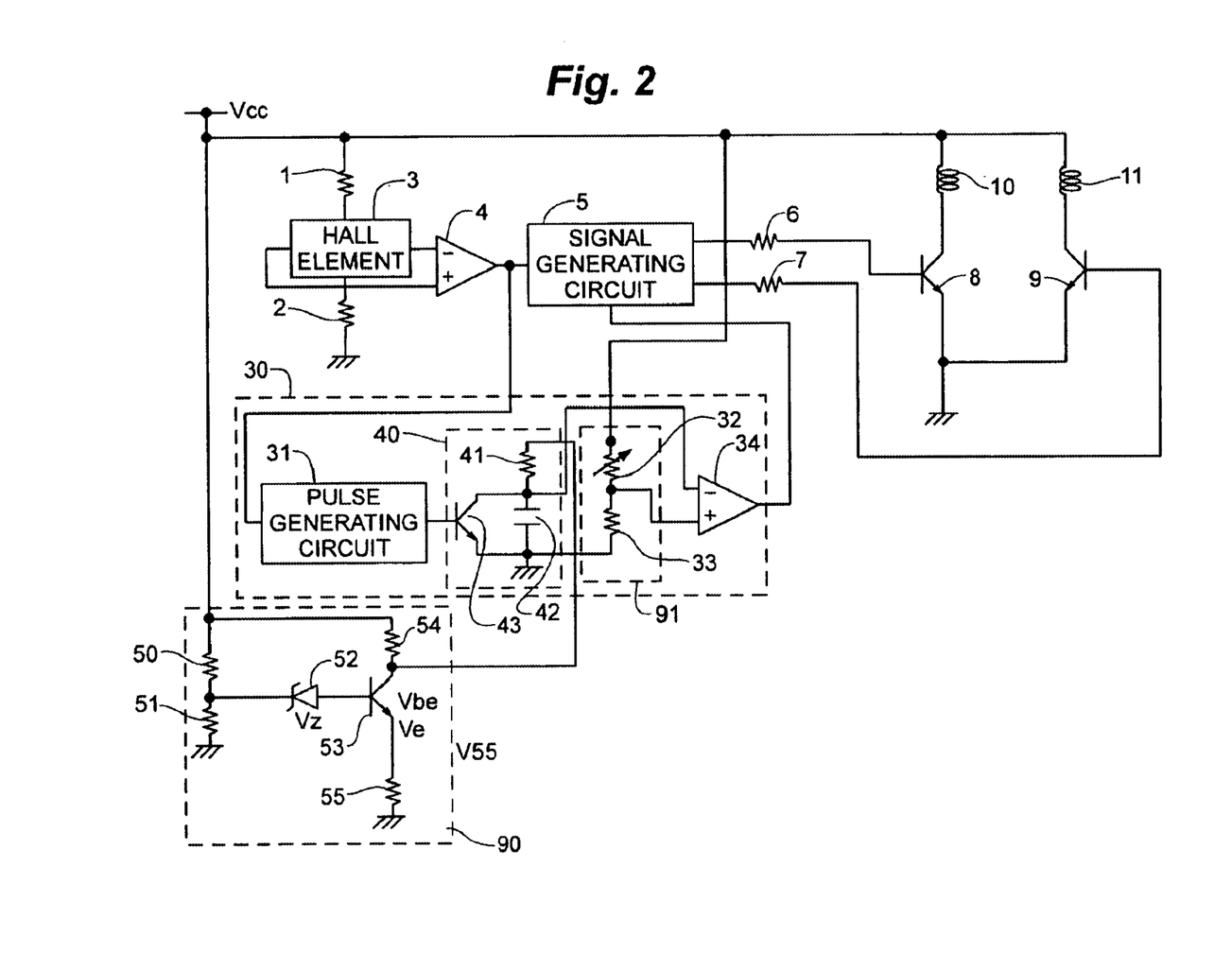
FIG. 2 is a circuit diagram of a fan motor driving circuit of another embodiment according to the present invention.

FIG. 2 shows another embodiment of a fan motor driving circuit according to the present invention.

In the power source voltage detecting means 90, the power source voltage Vcc is divided by the resistors 50 and 51 and the divided voltage is applied to the base of the transistor 53 through the Zener diode 52 only when the power source voltage Vcc is increased over the rated voltage. The resistor 54 is connected between the collector of the transistor 53 and the power source, the emitter of the transistor 53 is grounded through the resistors 55, and the collector of the transistor 53 is connected to an end of a resistor 41 of a time constant circuit 40 in the rotary speed varying means 30.

In the fan motor driving circuit shown in FIG. 2, the rotary speed varying means 30 controls the fan motor so as to rotate at a rotary speed set by the output from the resistor 32 when the power source voltage Vcc is lower than the rated voltage, because no output is generated from the Zener diode 52, the transistor 53 is not fired, and a current is supplied to the resistor 41 from the power source through the resistor 54.

A current flows through the transistor 53 and a voltage across the resistor 54 is reduced when the power source voltage Vcc is increased over the Zener voltage of the Zener diode 52. An angle of inclanation of the saw tooth wave generated by the resistor 41 and the capacitor 42, and the conducting current duty of the output pulse of the rotary speed varying means 30 is reduced, so that the conducting current signal generating circuit 5 serves as to reduce the rotary speed of the motor.

Figure 3:
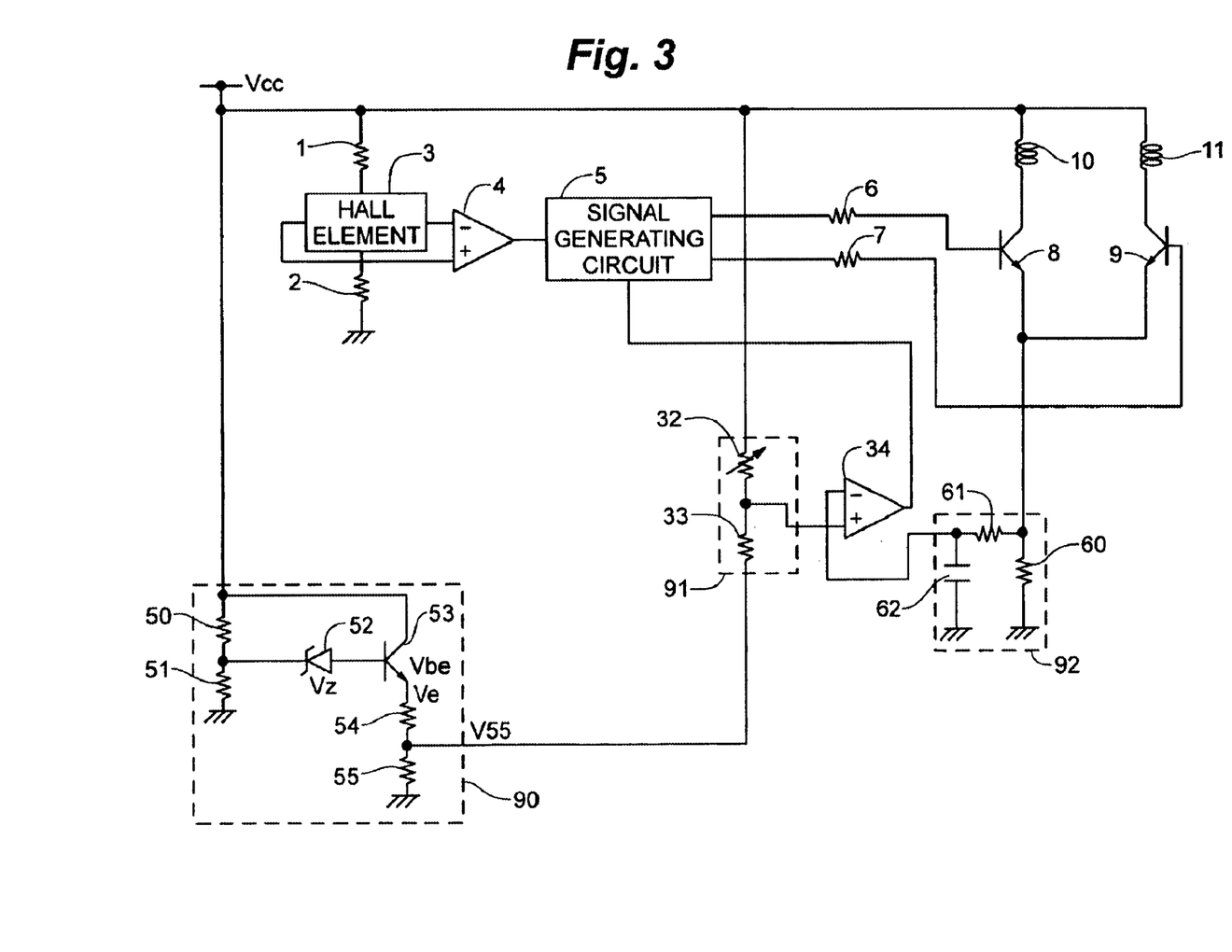
FIG. 3 is a circuit diagram of a fan motor driving circuit of a further embodiment according to the present invention.

FIG. 3 shows a further embodiment of a fan motor driving circuit according to the present invention.

In this embodiment, the rotary speed varying means 30 is deleted from the fan motor driving circuit show in FIG. 1.

In the power source voltage detecting means 90, the power source voltage Vcc is divided by the resistors 50 and 51 and the divided voltage is applied to the base of the transistor 53 through the Zener diode 52 only when the power source voltage Vcc is increased over the rated voltage. The collector of the transistor 53 is connected to the power source, the emitter of the transistor 53 is connected to the ground through the resistors 54 and 55, and the connecting point of the resistors 54 and 55 is connected to the end of the resistor 33 of the rotary speed instructing means 91.

A connecting point of the resistors 32 and 33 of the rotary speed instructing means 91 is connected to one of input terminals of the comparator 34, the emitters of the transistors 8 and 9 are grounded through a resistor 60 of a current detecting means 92, and connected to the other of input terminals of the comparator 34 through a smoothing circuit consisting of a resistor 61 and a capacitor 62.

In the fan motor driving circuit shown in FIG. 3, the rotary speed of the fan motor is controlled by balancing the voltage value of the rotary speed instructing voltage and the voltage value of the resistor 60 of the current detecting means 92.

When the voltage Vcc of the power source is lower than the rated voltage, no output is generated from the Zener diode 52, and the transistor 53 is not fired. Accordingly, a reference voltage determined by the resistors 32, 33 and 55 is supplied to one of input terminals of the comparator 34, and a voltage across the resistor 60 generated in proportion to a winding current of the fan motor is applied to the other of input terminals of the comparator 34 through the smoothing circuit consisting of the resistor 61 and the capacitor 62, and compared with the reference voltage by the comparator 34, so that a constant—current driving system wherein the transistors 8 and 9 are controlled by a balanced output from the comparator 34 through the conducting current signal generating circuit 5 is realized, and that the fan motor is rotated at a speed corresponding to the reference voltage.

A current flows through the transistor 53 and a voltage V55 across the resistor 55 is increased when the power source voltage Vcc is increased more than the rated voltage. As a result, the reference voltage of the comparator 34 is elevated, and a conducting current duty of an output pulse from the comparator 34 is reduced, so that the elevation of the rotary speed of the motor is suppressed.

Figure 4:
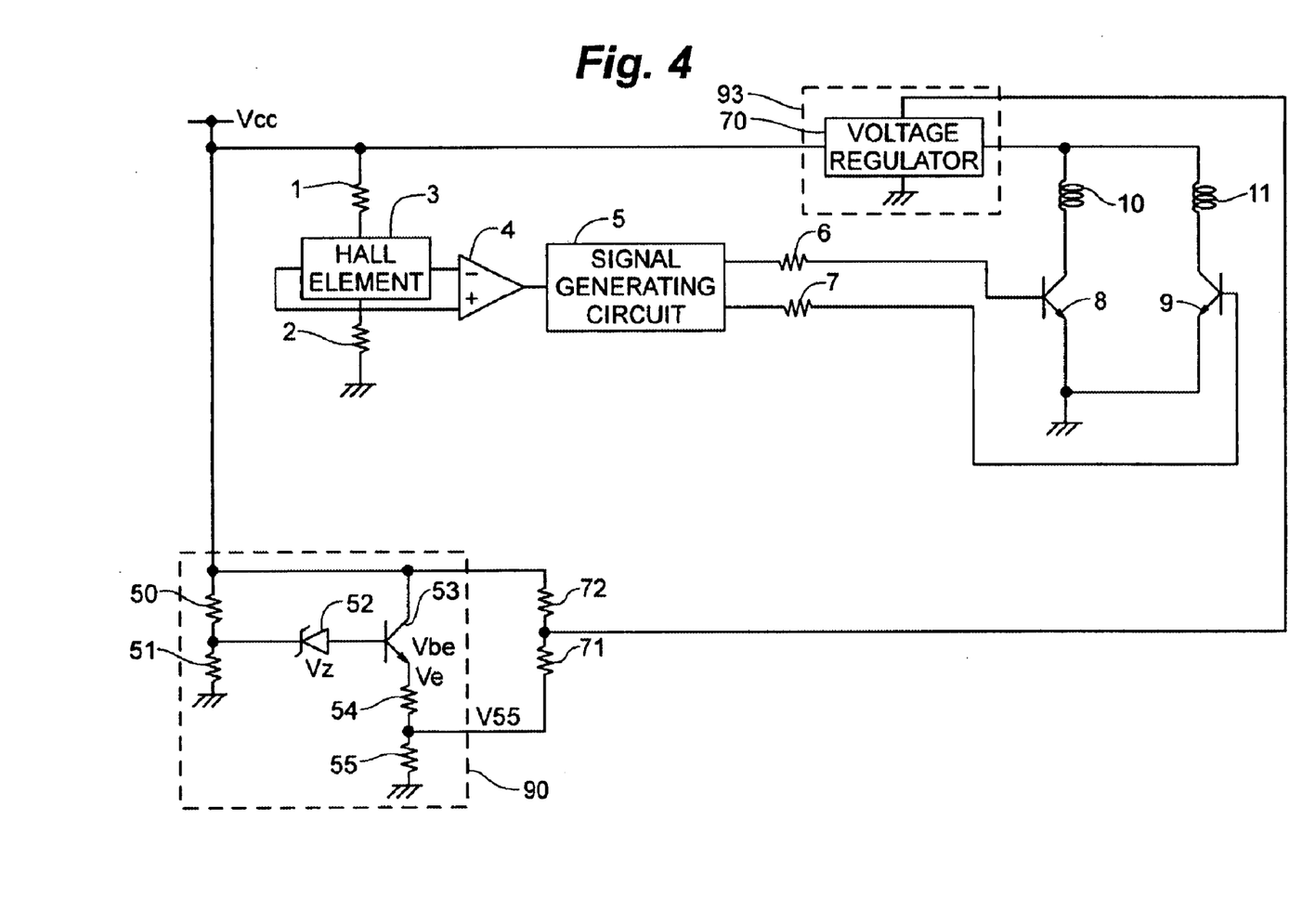
FIG. 4 is a circuit diagram of a fan motor driving circuit of a still further embodiment according to the present invention.

FIG. 4 shows yet further embodiment of a fan motor driving circuit according to the present invention.

In this embodiment, the rotary speed varying means 30 is deleted from the fan motor driving circuit shown in FIG. 1.

In the power source voltage detecting means 90, the power source voltage Vcc is divided by the resistors 50 and 51 and the divided voltage is applied to the base of the transistor 53 through the Zener diode 52. The collector of the transistor 53 is connected to the power source, the emitter of the transistor 53 is grounded through the resistors 54 and 55, and the connecting point of the resistors 54 and 55 is connected to the power source through a series circuit of resistors 71 and 72.

A three—terminal voltage regulator (voltage control means) 70 having an output voltage varying function is inserted between the power source and the windings 10 and 11, and a connecting point of the resistors 71 and 72 is connected to a voltage control terminal of the three—terminal voltage regulator 70.

The fan motor shown in FIG. 4 is rotated at the rated speed according to the voltage applied to the voltage control terminal of the three—terminal voltage regulator 70 from the connecting point of the resistors 71 and 72, when the power source voltage Vcc is lower than the rated voltage, because no output is generated from the Zener diode 52, the transistor 53 is not fired, and no voltage is generated across the resistor 55.

A current flows through the Zener diode 52 and the transistor 53, and the voltage V55 is generated across the resistor 55 when the power source voltage Vcc is increased. As a result, the voltage of the control terminal of the three—terminal voltage regulator 70 is elevated, and an output voltage of the three—terminal voltage regulator 70 is reduced, so that the elevation of the rotary speed of the fan motor is suppressed.

Figure 5:
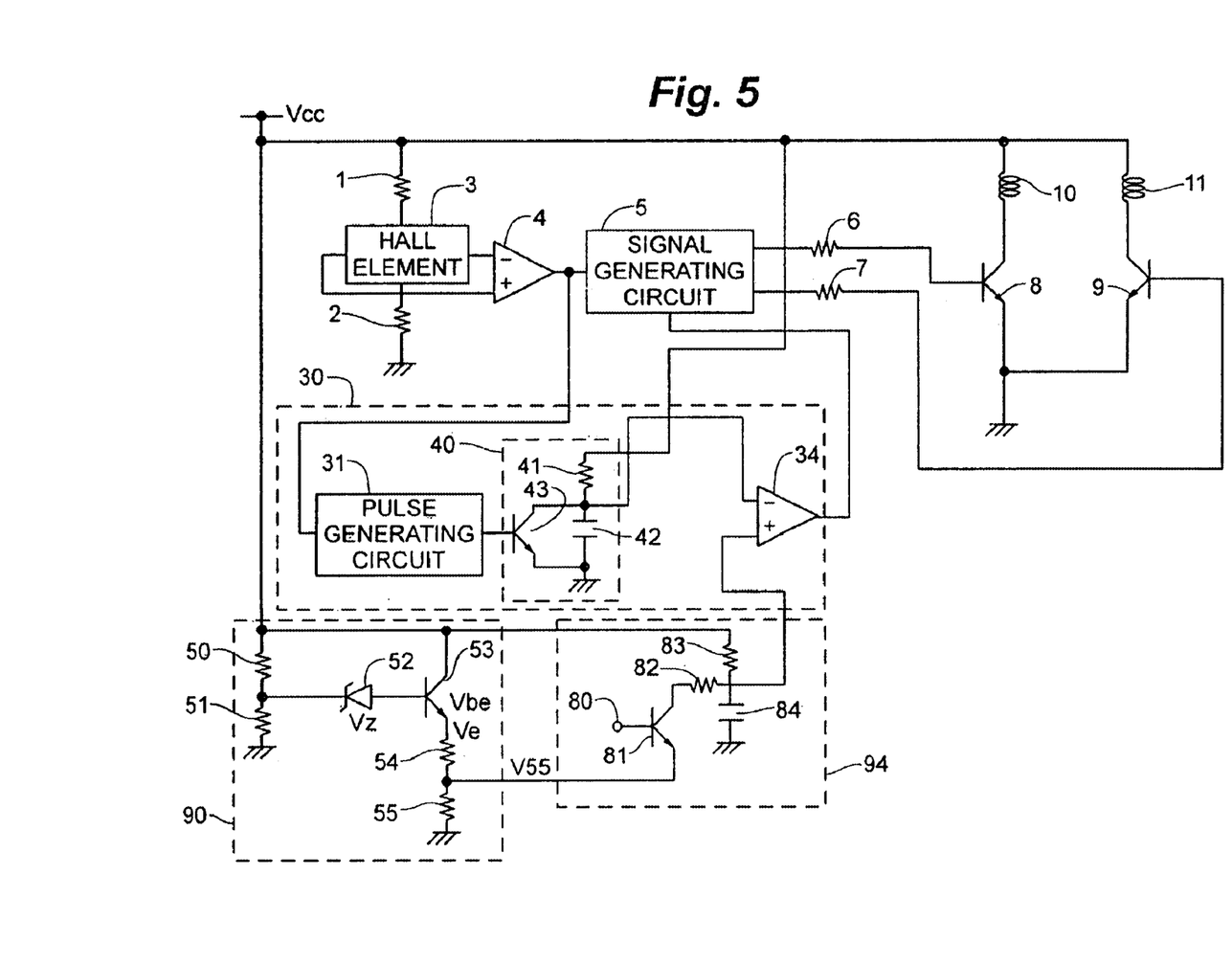
FIG. 5 is a circuit diagram of a fan motor driving circuit of the other embodiment according to the present invention.

FIG. 5 shows the other embodiment of a fan motor driving circuit according to the present invention.

In the power source voltage detecting means 90, the power source voltage Vcc is divided by the resistors 50 and 51 and the divided voltage is applied to the base of the transistor 53 through the Zener diode 52. The collector of the transistor 53 is connected to the power source, the emitter of the transistor 53 is grounded through the resistors 54 and 55.

Further, a PWM rotary speed instructing means 94 is provided. In the PWM rotary speed instructing means 94, a PWM pulse signal 80 is applied to a base of a transistor 81, resistors 82 and 83 are connected between a collector of the transistor 81 and the power source, a connecting point of the resistors 82 and 83 is grounded through a capacitor 84 and connected to the input terminal of the comparator 34, and the connecting point of the resistors 54 and 55 is connected to an emitter of the transistor 81.

The fan motor shown in FIG. 5 is rotated at a speed according to a direct current voltage corresponding to the duty of the PWM pulse signal 80 produced by a soothing circuit of the resisters 82 and 83, and a capacitor 84, when the power source voltage Vcc is lower than the rated voltage, no output is generated from the Zener diode 52, the transistor 53 is not fired, and no voltage is generated across the resistor 55.

A current flows through the Zener diode 52 and the transistor 53 and the voltage V55 generated across the resistor 55 is increased when the power source voltage Vcc is increased over the rated voltage. As a result, the emitter voltage of the transistor 81 and the smoothed direct current voltage are elevated, and the conducting current duty of the output pulse of the comparator 34 is reduced, so that the elevation of the rotary speed of the fan motor is suppressed.

In the above embodiments of the present invention, the Zener diode and the transistors are used as the power source voltage detecting means, however, other circuit may be used. It goes without saying that the fan motor driving circuit of the present invention can be used regardless of the phase number, winding number of the fan motor, unipolar or bipolar conducting system, or rotor position detecting system.

The fan motor driving circuit of the present invention has following merits.

(1) The fan motor can be rotated at the referenced speed when the power source voltage is lower than the rated voltage, and the rotary speed of the fan motor can be suppressed to a value not more than the setting value when the power source voltage is higher than the rated voltage.

(2) No speed feedback circuit is necessary, so that the fan motor driving circuit can be simplified and installed in the minimum space, and the cost of the parts thereof is reduced.

(3) The elevation of the speed of the fan motor can be suppressed, so that the noise is small, the current is not so increased, and the temperature of the circuit is prevented from being elevated.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A brushless fan motor driving circuit, comprising:
   (a) means for detecting a position of a permanent magnet of a rotor,
   (b) a conducting current signal generating circuit for generating a conducting current signal according to a first signal and according to an output of the position detecting means,
   (c) a conducting current control element for energizing stator windings of the motor according to the conducting current signal,
   (d) means for varying a rotary speed of the motor, including means for generating a rotary speed instructing voltage and a saw-tooth wave generating circuit that includes a time constant circuit having a resistor and a capacitor and that generates a saw-tooth wave signal;
   (e) means for detecting a power source voltage and outputting a voltage in proportion to a difference between the power source voltage and a rated voltage when the power source voltage is greater than a predetermined rated voltage, and
   (f) means for controlling a rotary speed of a fan motor to a predetermined value by automatically varying the rotary speed instructing voltage by the output voltage of the power source voltage detecting means when the power source voltage is greater than the predetermined rated voltage,
   wherein the rotary speed varying means compares the saw-tooth wave signal with the rotary speed instructing voltage to provide the first signal so as to vary an energizing time of the stator windings.

2. A brushless fan motor driving circuit, comprising:
   (a) means for detecting a position of a permanent magnet of a rotor,
   (b) a conducting current signal generating circuit for generating a conducting current signal according to a first signal and according to an output of the position detecting means,
   (c) a conducting current control element for energizing stator windings of the motor according to the conducting current signal,
   (d) means for varying a rotary speed of the motor, including means for generating a rotary speed instructing voltage, and a saw-tooth wave generating circuit that includes a time constant circuit having a resistor and a capacitor and that generates a saw-tooth wave signal;
   (e) means for detecting a power source voltage and outputting a voltage in proportion to a difference between the power source voltage and a rated voltage when the power source voltage is greater than a predetermined rated voltage, and
   (f) means for controlling a rotary speed of a fan motor to a predetermined value by automatically varying an inclined angle of the saw-tooth wave signal of the rotary speed varying means according to the output voltage of the power source voltage detecting means when the power source voltage is greater than the predetermined rated voltage,
   wherein the rotary speed varying means compares the saw-tooth wave signal with the rotary speed instructing voltage to provide the first signal so as to vary an energizing time of the stator windings.

3. A brushless fan motor driving circuit, comprising:
   (a) means for detecting a position of a permanent magnet of a rotor,
   (b) a conducting current signal generating circuit for generating a conducting current signal according to a first signal and according to an output of the position detecting means,
   (c) a conducting current control element for energizing stator windings of the motor according to the conducting current signal,
   (d) means for detecting a power source voltage and outputting a voltage in proportion to a difference between the power source voltage and a rated voltage when the power source voltage is greater than a predetermined rated voltage,
   (e) means for detecting a current from the conducting current control element,
   (f) a comparator for comparing an output of the conducting current detecting means with an output of the power source voltage detecting means to produce the first signal, and
   (g) means for controlling a rotary speed of a fan motor to a predetermined value by automatically controlling the conducting current signal generating circuit when the power source voltage is greater than the predetermined rated voltage.

* * * * *